United States Patent [19]

Luijten et al.

[11] Patent Number: 5,926,757
[45] Date of Patent: Jul. 20, 1999

[54] MOBILE TELECOMMUNICATION SYSTEM BASE STATION, MOBILE TERMINAL

[75] Inventors: Guido Jozef Hubertus Luijten, Delft; Antonius Hendrikus Johannes Norp, The Hague, both of Netherlands

[73] Assignee: Koninklijke PTT Nederland N.V., Netherlands

[21] Appl. No.: 08/652,604

[22] PCT Filed: Dec. 12, 1994

[86] PCT No.: PCT/EP94/04133

§ 371 Date: Jun. 5, 1996

§ 102(e) Date: Jun. 5, 1996

[87] PCT Pub. No.: WO95/17076

PCT Pub. Date: Jun. 22, 1995

[30] Foreign Application Priority Data

Dec. 13, 1993 [NL] Netherlands ............................ 9302170

[51] Int. Cl.[6] .................................................... H04B 7/26
[52] U.S. Cl. ......................... 455/422; 455/445; 455/561; 370/349; 370/400
[58] Field of Search ..................................... 455/422, 432, 455/433, 435, 436, 438, 440, 445, 450, 455, 62, 63, 67.1, 560, 561; 370/312, 349, 400, 401, 402, 403, 404, 405

[56] References Cited

U.S. PATENT DOCUMENTS

| | | |
|---|---|---|
| 3,731,002 | 5/1973 | Pierce ........................................ 370/405 |
| 4,144,412 | 3/1979 | Ito et al. . |
| 4,621,362 | 11/1986 | Sy ............................................ 370/403 |
| 5,155,859 | 10/1992 | Harris et al. ........................... 455/67.1 |
| 5,420,862 | 5/1995 | Perlman ................................... 370/405 |
| 5,481,532 | 1/1996 | Hassan et al. .......................... 370/400 |
| 5,590,133 | 12/1996 | Billstrom et al. ....................... 455/433 |

OTHER PUBLICATIONS

J.A. Audestad, "Application of Signalling System No. 7 to Public Land Mobile Networks: Status and Evolution", Telektronikk, No. 1, 1990, pp. 56–68.

*Primary Examiner*—Thanh Cong Le
*Attorney, Agent, or Firm*—Michaelson & Wallace; Peter L. Michaelson; John C. Pokotylo

[57] ABSTRACT

If, in a mobile telecommunication system comprising at least one mobile terminal, at least one base station and at least one processor device for processing signalling messages, such as an exchange, the signalling messages to be transmitted from the mobile terminal are provided with a first destination code if they are destined for the exchange and with a second destination code if they are destined for the base station, the signalling messages provided with the first destination code are able to pass through the base station transparently without extensive analyses being necessary in the base station. Preferably, signalling messages to be transmitted from the exchange are provided with a terminal destination code if they are destined for the mobile terminal and with a base station destination code if they are destined for the base station, signalling messages provided with a terminal destination code being returned to the exchange by the base station if the link with the mobile terminal is not functioning well.

7 Claims, 3 Drawing Sheets

MOBILE TELECOMMUNICATION SYSTEM BASE STATION, MOBILE TERMINAL

BACKGROUND OF THE INVENTION

The invention relates to a mobile telecommunication system comprising at least one processor device for processing signalling messages, at least one base station coupled to the processor device, and at least one mobile terminal which can be coupled to the base station.

Such a mobile telecommunication system is disclosed in the paper entitled "Application of Signalling System No. 7 to Public Land Mobile Networks: Status and Evolution" by Jan A. Audestad in Telektronikk No. 1, 1990, 621.391.037.37:621.396.931. The mobile telecommunication system described therein comprises a processor device for processing signalling messages (in FIG. 1 of the said paper, this relates to an MSC or mobile switching center, and in another case, it relates, for example, to an LE or local exchange), a base station (in FIG. 1 of the said paper, this relates to a BSS or base station system) and a mobile terminal (in FIG. 1 of the said paper, this relates to an MS or mobile station). Signalling messages which have to be processed in the processor device are, for example, a call set-up message and a location update message, in contrast to signalling messages which are processed in the base station, such as, for example, a resource management message. In this connection, a base station is defined as the whole of an intelligent BSC or base station controller and one or more aerials which are each coupled to a BST or base station transceiver and which are controlled by the BSC. The base station and the processor device are mutually coupled, for example via a physical connection, and the mobile terminal and the base station can be mutually coupled, for example via a radio link. In this known mobile telecommunication system, the mobile terminal (a lowest-ranked ranked entity) transmits signalling messages to the base station (an entity with lowest-but-one ranking) which analyzes said signalling messages by investigating which mobile terminal the signalling messages originate from (on the basis of a frequency and/or time-slot analysis or on the basis of an analysis of a link identifier) and by analyzing the content of the signalling messages, and then determining, on the basis of the preceding analyses, which entity they are destined for. Depending on the analysis result, some signalling messages are passed to the processor device (a higher-ranked entity) and other signalling messages are retained for a further processing.

Provided the mobile terminal is located in the base area of the base station, certain analytical processes proceed in the base station which have to be terminated in the base station as soon as the mobile terminal moves to an adjacent base area of an adjacent base station (a so-called handover procedure) and which have to be started up in the adjacent base station. The known mobile telecommunication system has, inter alia, the disadvantage that, for example, in the case of a handover procedure in a base station, analytical processes have to be terminated and precisely the same analytical processes have to be started up in an adjacent base station.

SUMMARY OF THE INVENTION

The object of the invention is, inter alia, to provide a mobile telecommunication system of the type mentioned in the preamble in which the starting-up and termination of analytical processes are handled more efficiently.

For this purpose, the mobile telecommunication system according to the invention has the characteristic that signalling messages to be transmitted from the mobile terminal to the processor device via the base station are provided with a first destination code, signalling messages to be transmitted from the mobile terminal to the base station being provided with a second destination code.

By providing signalling messages to be transmitted from the mobile terminal with a first destination code if they are destined for the processor device and providing them with a second destination code if they are destined for the base station, signalling messages provided with a first destination code are able to pass through the base station transparently. As a result, it is no longer necessary to arrange for a base station to analyse all signalling messages originating from the mobile terminal and certain analytical processes can therefore be avoided in the base station.

The invention is based, inter alia, on the insight that, for example, in the case of a handover procedure, the analytical processes to be terminated in a base station and precisely the same analytical processes to be set up in an adjacent base station can be replaced by corresponding analytical processes which proceed in a higher-ranking entity and which, in the case of a handover procedure, no longer have to be terminated and set up elsewhere if the higher entity is in communication with both the base station and the adjacent base station. Said higher entity is reached most efficiently if intervening entities are able to be passed through in a transparent manner, which becomes possible by adding the destination codes to the signalling messages.

The addition of destination codes to signalling messages does not exclude the possibility that two signalling messages are together provided with one destination code and does not even exclude the possibility of splitting three signalling messages into two parts, the first signalling message and the first half of the second signalling message being provided with a destination code and the second half of the second signalling message and the third signalling message being provided with a destination code.

A first embodiment of the mobile telecommunication system according to the invention has the characteristic that the base station is provided with comparison means for comparing first and second destination codes of signalling messages with at least one predetermined value and for transmitting, in response to a comparison result in one sense, a signalling message in the direction of the processor device and, in response to a comparison result in another sense for retaining a signalling message.

By using said comparison means, whether, a signalling message should be transmitted in the direction of the processor device or should be retained is determined in a simple manner in the base station on the basis of a destination code.

A second embodiment of the mobile telecommunication system according to the invention has the characteristic that signalling messages to be transmitted from the base station to the processor device are provided with a third destination code, the processor device being provided with comparison means for comparing first and third destination codes of signalling messages with at least one predetermined value and for transmitting, in response to a comparison result in one sense, a signalling message and, in response to a comparison result in another sense, for retaining a signalling message.

By providing signalling messages to be transmitted from the base station with a third destination code if they are destined for the processor device and, for example, providing them with a fourth destination code if they are destined for a higher-ranking processor device (a still higher-ranking entity), signalling messages not destined for the processor device are able to pass through the processor device transparently. By using the comparison means, whether a signalling message should be transmitted in the direction of a higher-ranking processor device or should be retained is determined in a simple manner in the processor device on the basis of a destination code.

The first and third destination code may either correspond to one another in their entirety or differ to a greater or lesser extent. Only the fact that the processor device is able to recognize both destination codes as being destined for it is of importance. The first, second, third and fourth destination code may furthermore be of the explicit type or of the implicit type. In the case of destination codes of the explicit type, one particular base station or one particular processor device is indicated, the possibility even arising of a mobile terminal transmitting a signalling message provided with a second destination code to a base station A, said second destination code relating to a base station B, after which the base station A transmits said signalling message to a processor device which then transmits the signalling message to the base station B. In the case of destination codes of the implicit type, for example, a type of entity (base station, processor device) or a type of functionality (for example, call handling) is indicated, the base station and the processor device having to be preprogrammed with data relating to which type of entity they are or with data relating to the functionalities which it is possible to carry out on the spot.

A third embodiment of the mobile telecommunication system according to the invention has the characteristic that signalling messages to be transmitted from the processor device to the mobile terminal via the base station are provided with a terminal destination code, signalling messages to be transmitted from the processor device to the base station being provided with a base-station destination code, and the base station being provided with detection means for detecting base-station destination codes and, in response thereto, retaining a signalling message and for detecting terminal destination codes and, in response thereto, transmitting a signalling message in the direction of the mobile terminal.

By providing signalling messages to be transmitted from the processor device to the mobile terminal via the base station with a terminal destination code and providing signalling messages to be transmitted from the processor device to the base station with a base-station destination code, whether a signalling message should be transmitted in the direction of the mobile terminal or should be retained is determined in a simple manner in the base station on the basis of a destination code by using the detection means. The base station destination code may indicate a certain base station directly, but it may also indicate a connection indirectly, via which connection the base station can be reached. In this case, the base-station destination code comprises one or more connection codes.

It should be pointed out that it is known from the said paper to divide signalling messages to be exchanged between the base station and the processor device into two types, signalling messages of one type being transmitted via a DTAP protocol and signalling messages of the other type being transmitted via a BSSMAP protocol. However, it is true of both types of signalling messages that whether a signalling message belongs to one type or to the other type is clear only after an extensive analysis of the content of the signalling message. In the case of the mobile telecommunication system according to the invention, such analytical processes are avoided.

It should furthermore be pointed out that it is generally known to insert a link identifier in a signalling message. However, it is again true of such a link identifier (for example, call id) that which link identifier is contained in a signalling message is clear only after an extensive analytical process. In the mobile telecommunication system according to the invention, such an analytical process is avoided.

A fourth embodiment of the mobile telecommunication system according to the invention has the characteristic that the processor device is provided with memory means for storing at least one coupling between a terminal destination code and a base-station destination code for each mobile terminal, and adjustment means coupled to the memory means for adjusting, in response to an adjustment message, at least one coupling stored in the memory means, the base station being provided with link detection means for detecting whether or not a link between the base station and the mobile terminal is functioning well, and return means coupled to the link detection means for returning a signalling message provided with a terminal destination code to the processor device in response to it having been detected that the link is not functioning well.

On the basis of couplings stored in the memory means, via which base station each mobile terminal receives the signalling messages is determined in the processor device. This stored information may be adjusted by the adjustment means in response to an adjustment message originating, for example, from a higher-ranking processor device. Such an adjustment message then comprises at least one indication of which coupling it relates to or which terminal destination code (and possibly which old base-station destination code) and an indication of which new base-station destination code it relates to. As soon as the link detection means in the base station have detected that a link between the base station and the mobile terminal is not functioning well, the return means return the signalling message provided with a terminal destination code to the processor device. Because the processor device receives a signalling message provided with a terminal destination code, it is known, in the case of the processor device, that said signalling message has not been able to reach the terminal and the processor device may, for example, retransmit the signalling message on the basis of the information stored in the memory means or wait until said information has been adjusted in response to an adjustment message. The link detection means present in the base station may be designed in various ways, for example as a transmitter/receiver which transmits a code word to the mobile terminal during each time interval and, in response thereto, should receive a (further) code word, or as a transmitter/receiver which adds a code word to each signalling message to be transmitted and should receive a (further) code word for each signalling message to be received, or as a receiver which detects the received power of the radio signal.

A fifth embodiment of the mobile telecommunication system according to the invention has the characteristic that the base station is provided with adjustment-message generating means coupled to the link detection means for generating an adjustment message.

In this case, the base station generates the adjustment message. In the case of a forward handover procedure, said adjustment message will originate from the next base station (which base station should therefore be adequately informed by the mobile terminal), the adjustment message having transmitted from the adjacent base station to the processor device, preferably before the signalling message provided with the terminal destination code is returned to the processor device from the (old) base station. In the case of a backward handover procedure, said adjustment message will originate from the (old) base station, the adjustment message having to be transmitted from the (old) base station to the processor device, preferably before the signalling message provided with the terminal destination code is returned to the processor device from the (old) base station. In both cases, this can be achieved in a simple manner by retaining the signalling message to be returned and provided with a terminal destination code in the (old) base station for some time (for example, 100 msec) before it is actually returned. In the case of a backward handover procedure, instead of introducing the disadvantageous delay time (of, for example, 100 msec), use may also be made of a certain sequence relationship, signalling messages only being returned after the adjustment message has been transmitted.

A sixth embodiment of the mobile telecommunication system according to the invention has the characteristic that the mobile terminal is provided with link detection means for detecting whether or not a link between the base station and the mobile terminal is functioning well, and adjustment-message generating means coupled to the link detection means for generating an adjustment message.

In this case, the mobile terminal generates the adjustment message. As regards the link detection means present in the mobile terminal, the same is true as for the link detection means present in the base station, and both the forward handover procedure and the backward handover procedure can be used. Furthermore, it is conceivable that the mobile terminal dispatches two adjustment messages, one for the base station and one for the processor device, or that the mobile terminal dispatches adjustment messages via both base stations.

The invention furthermore relates to a base station for use in a mobile telecommunication system.

The base station according to the invention has the characteristic that the base station is provided with comparison means for comparing first and second destination codes of signalling messages originating from a mobile terminal with at least one predetermined value and for transmitting, in response to a comparison result in one sense, a signalling message in the direction of a processor device and, in response to a comparison result in another sense, for retaining a signalling message.

A first embodiment of the base station according to the invention has the characteristic that the base station is provided with generating means for generating a signalling message having a third destination code and being destined for the processor device.

A second embodiment of the base station according to the invention has the characteristic that the base station is provided with detection means for detecting base-station destination codes and, in response thereto, retaining a signalling message, and for detecting terminal destination codes and, in response thereto, transmitting a signalling message in the direction of a mobile terminal.

A third embodiment of the base station according to the invention has the characteristic that the base station is provided with link detection means for detecting whether or not a link between the base station and the mobile terminal is functioning well, and return means coupled to the link detection means for returning a signalling message provided with a terminal destination code to the processor device in response to it having been detected that the link is not functioning well.

A fourth embodiment of the base station according to the invention has the characteristic that the base station is provided with adjustment-message generating means coupled to the link detection means for generating an adjustment message.

The invention also relates furthermore to a mobile terminal for use in a mobile telecommunication system.

The mobile terminal according to the invention has the characteristic that the mobile terminal is provided with generating means for generating a signalling message having a first destination code and being destined for a processor device and for generating a signalling message having a second destination code and being destined for a base station.

A first embodiment of the mobile terminal according to the invention has the characteristic that the mobile terminal is provided with link detection means for detecting whether or not a link between the base station and the mobile terminal is functioning well, and adjustment-message generating means coupled to the link detection means for generating an adjustment message.

From EP 0 558 041, it is known to transmit so-called "broadcast data" from a processor device to a mobile terminal via one or more base stations. It is not known therefrom to transmit signalling messages from a mobile terminal to a base station, on the one hand, and to a processor device via a base station, on the other hand, said signalling messages being provided with destination codes.

"Application of Signalling System No. 7 to Public Land Mobile Networks: Status and Evolution", by Jan A. Audestad, in Telektronikk No. 1, 1990, 621.391.037.37:621.396.931.

EP 0 558 041

All references are deemed to be incorporated in this application.

BRIEF DESCRIPTION OF THE DRAWINGS

The invention will be explained in greater detail with reference to an exemplary embodiment shown in the figures. In the figures.

DETAILED DESCRIPTION

Figure 1:
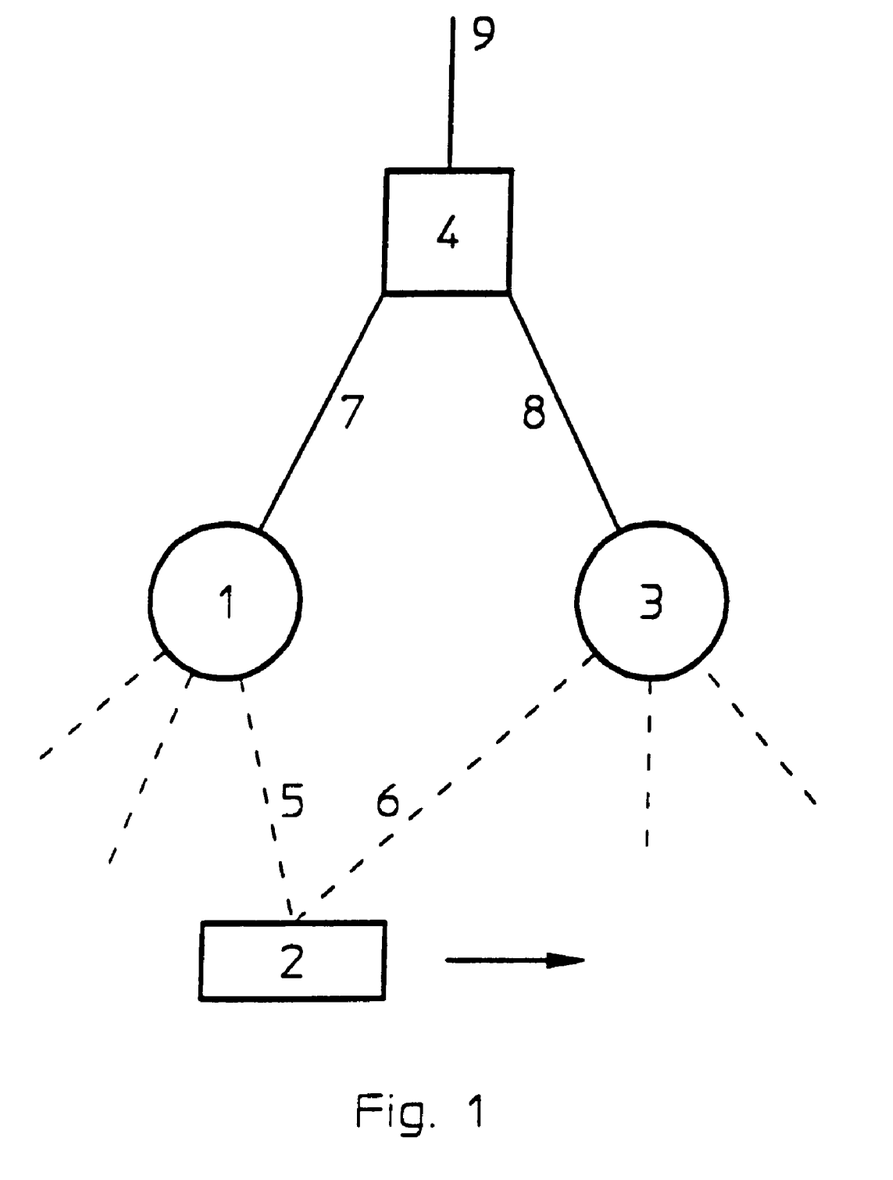
FIG. 1 shows an overview of a telecommunication system according to the invention.

The telecommunication system according to the invention shown in FIG. 1 comprises a base station 1 which is coupled via a radio link 5 to a mobile terminal 2 which can be coupled via a radio link 6 to a base station 3 (after a handover procedure). Base station 1 is coupled via a connection 7 to a processor device 4 for processing signalling messages, such as, for example, a local exchange (LE) or a mobile switching center (MSC) which is coupled via a connection 8 to base station 3 and which is coupled via a connection 9 to a higher entity (such as an IN service control point).

Figure 2:
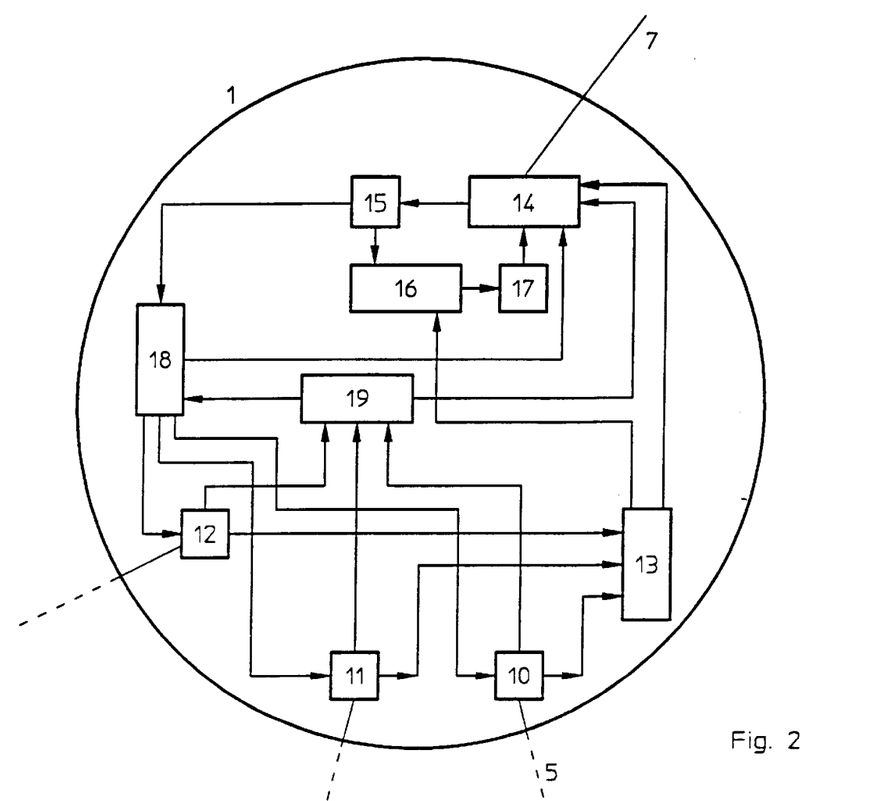
FIG. 2 shows a base station according to the invention for use in the telecommunication system according to the invention.

The base station 1 shown in FIG. 2 comprises a transceiver 10 which is coupled to radio link 5, a transceiver 11 which is coupled to a further radio link and a transceiver 12 which is coupled to yet a further radio link. Outputs of transceivers 10, 11 and 12 are each coupled to a first input, a second input and a third input, respectively, of comparison means 13, a first output of which is coupled to network termination (NT) 14, which is connected to connection 7. A second output of comparison means 13 is coupled to a first input of processor 16, an output of which is coupled to an input of generating means 17. An output thereof is coupled to a second input of NT 14. A second input of processor 16 is coupled to a first output of detection means 15, an input of which is coupled to an output of NT 14. A second output of detection means 15 is coupled to a first input of return means 18, of which a first output, a second output and a third output are coupled to an input of transceiver 10, transceiver 11 and transceiver 12, respectively. A fourth output of return means 18 is coupled to a third input of NT 14, and a second input of return means 18 is coupled to a first output of adjustment-message generating means 19, a second output of which is coupled to a fourth input of NT 14. A first input, a second input and a third input of adjustment-message generating means 19 are coupled to a control output of transceiver 10, transceiver 11 and transceiver 12, respectively. Each transceiver comprises link detection means coupled to the control output, transmitting means coupled to the input for transmitting via the radio link signalling messages received via the input, and receiving means coupled to the output for receiving, via the radio link, a signalling message transmitted by a mobile terminal and for generating said received signalling message at the output. NT 14 has a transmitter for transmitting, via connection 7, signalling messages which have been received via the first, second, third and/or fourth input, and it has a receiver for receiving signalling messages transmitted via connection 7 by a processor device and for generating received signalling messages at the output.

As regards signalling messages originating from higher entities, the base station 1 shown in FIG. 2 functions as follows. A signalling message which arrives via connection 7 and is provided with either a base-station destination code or a terminal destination code is received by NT 14, which dispatches said signalling message to detection means 15. In the case of a base-station destination code, this is detected by detection means 15, for example by comparing the base-station destination code with a predetermined value. If equality is found, then a base-station destination code is involved and the signalling message is fed to processor 16 which processes it further. In the case of a terminal destination code, this is detected by detection means 15, for example by comparing the terminal destination code with the predetermined value. If inequality is found, then a terminal destination code is involved and the signalling message is fed via return means 18, which store the signalling message, to a transceiver 10, 11 or 12. The choice of the transceiver is made on the basis of the terminal destination code, for example by detection means 15 and/or return means 18 by consulting a table or by involving processor 16 in the procedure. The signalling message is optionally extended temporarily with a certain transceiver code. The chosen transceiver then transmits the signalling message via the associated radio link to the mobile terminal associated with the terminal destination code. The signalling message is transmitted by the transceiver only if the associated radio link is functioning correctly. If this is not the case, it is detected by the link detection means contained in each transceiver, and in response to this, a signal is transmitted from the transceiver concerned to adjustment-message generating means 19. The latter generate an adjustment message and send it to NT 14 for transmission via connection 7 and convey the signal, provided with the particular transceiver code, to return means 18 which also transmit the signalling message, which is still stored, to NT14 for transmission via connection 7.

As regards signalling messages originating from a mobile terminal, the base station 1 shown in FIG. 2 functions as follows. A signalling message which arrives via radio link 5 and is provided with either a first or a second destination code is received by transceiver 10, which transmits it to comparison means 13. The latter compare the destination code with a predetermined value, for example a value which corresponds to the second destination code, and in the event of equality, the signalling message is obviously destined for the base station and is fed to processor 16 for further processing. In the event of inequality, the signalling message is destined for a higher entity, for example an LE, and it is fed to NT 14 for further transmission via connection 7.

As regards signalling messages to be transmitted to processor device 4 or to a still higher-ranked entity, the base station 1 shown in FIG. 2 functions as follows. If processor 16 wishes to dispatch a signalling message to a higher-ranked entity, it transmits said signalling message to generating means 17 which add, for example, under the control of processor 16 a third (that is to say destined for processor device 4) or a fourth (that is to say destined for a still higher-ranked entity) destination code to the signalling message and then feed the entire signalling message to NT 14 for transmission via connection 7.

If transceivers 10, 11 and 12 receive signalling messages from mobile terminals on the basis of different time slots, two different signalling messages will never arrive at the same time, so that no problems will arise in comparison means 13 either. If, on the other hand, said transceivers receive signalling messages on the basis of different frequencies, there is the possibility that two different signalling messages arrive precisely at the same time. In this last case, there will have to be buffers either in transceivers 10, 11 and 12 or in comparison means 13. As a consequence of the complexity of base station 1, most of the units 10 to 19 inclusive shown in FIG. 2 will be provided with buffers in order to prevent undesirable interactions between different signals unless use is made of a further processor, not shown in FIG. 2, for controlling, in particular, comparison means 13, detection means 15, return means 18 and adjustment-message generating means 19. However, it is also possible for processor 16 to be responsible for these tasks.

Figure 3:
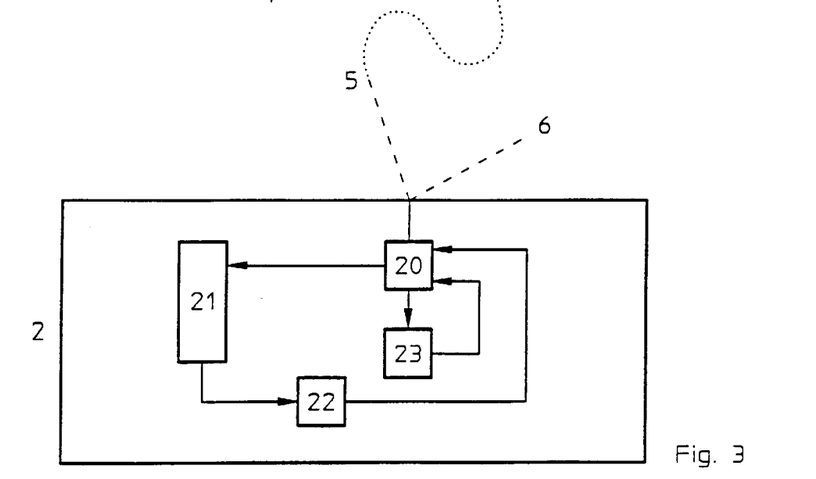
FIG. 3 shows a mobile terminal according to the invention for use in the telecommunication system according to the invention.

The mobile terminal 2 shown in FIG. 3 comprises a transceiver 20, a first output of which is coupled to an input of a processor 21. An output of processor 21 is coupled to an input of generating means 22, an output of which is coupled to a first input of transceiver 20. A second output thereof is coupled to an input of adjustment-message generating means 23, an output of which is coupled to a second input of transceiver 20.

The operation of mobile terminal 2 is as follows. A signalling message arriving via radio link 5 is received by transceiver 20 which transmits it to processor 21 for further processing. If processor 21 wishes to dispatch a signalling message to base station 1 or a higher-ranked entity, it transmits said signalling message to generating means 22 which add, for example, under the control of processor 21 a first (that is to say destined for processor device 4) or second (that is to say destined for base station 1) destination code to the signalling message and then feed the entire signalling message to transceiver 20 for transmission via radio link 5. The signalling message is transmitted by transceiver 20 only if the associated radio link is functioning correctly. If this is not the case, this is detected by the link detection means contained in transceiver 20, and in response thereto, a signal is transmitted from transceiver 20 to adjustment-message generating means 23. The latter generate an adjustment message and send it to transceiver 20 for transmission via radio link 5 or 6. The adjustment message then arrives either at base station 1 or at base station 3 in order subsequently to be processed therein and/or transmitted to a higher-ranked entity.

The remarks inserted in the description of FIG. 2 relate to the buffers to be added to units and the optional additional processor for controlling the units also apply, to a greater or lesser extent, to mobile terminal 2.

Figure 4:
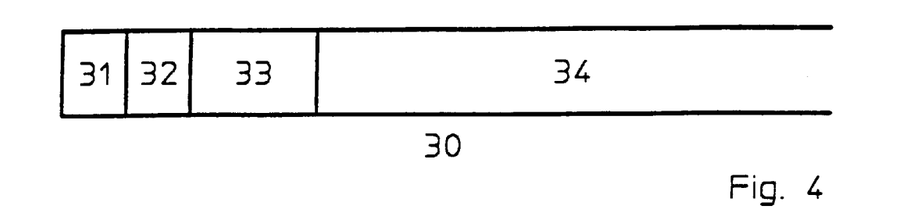
FIG. 4 shows a signalling message for use in the telecommunication system according to the invention.

The signalling message 30 shown in FIG. 4 comprises a section 31 which comprises, for example, a parameter for indicating the transmission of the message to higher- or lower-ranked entities, and it comprises a section 32 which comprises, for example, a further parameter for indicating whether the message is a signalling message or an adjustment message. Furthermore, signalling message 30 comprises a section 33 which comprises the destination code (the first, second, third, fourth destination code or the base-station destination code or the terminal destination code or another destination code, etc.) and a section 34 which comprises the actual signalling message.

The first and third destination code may either correspond to one another entirely or differ to a greater or a lesser extent. Only the fact that the processor device is able to recognize both destination codes as being destined for it is of importance. The first, second, third and fourth destination code may furthermore be of the explicit or of the implicit type.

In the case of destination codes of the explicit type, one particular base station or particular processor device is indicated, the possibility even arising that a mobile terminal transmits a signalling message provided with a second destination code to a base station A, said second destination code relating to a base station B, after which the base station A transmits said signalling message to a processor device which then transmits the signalling message to the base station B. In this procedure, the use of the parameter contained in section 31 is advantageous because, in transmitting from the mobile terminal to the base station A and from the base station A to the processor device, said parameter indicates that the signalling message is on its way to a higher-ranked entity. After receiving the signalling message, the processor device must arrange to alter said parameter in value to indicate that the signalling message is on its way to a lower-ranked entity (base station B). In this last case, it is therefore true that a second destination code together with a parameter forms a second destination code in one sense, while said second destination code together with a parameter forms a base-station destination code in another sense.

In the case of destination codes of the implicit type, for example, a type of entity (base station, processor device) or a type of functionality (for example, call handling) is indicated, the base station and processor device having to be preprogrammed with data relating to which type of entity they are and with data relating to the functionalities which it is possible to carry out on the spot.

Figure 5:
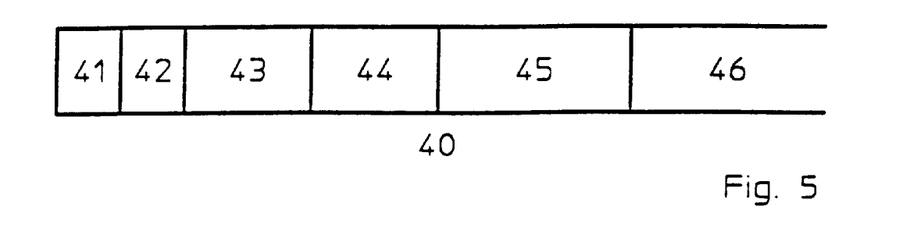
FIG. 5 shows an adjustment message for use in the telecommunication system according to the invention.

The adjustment message 40 shown in FIG. 5 comprises a section 41 which corresponds, for example, to section 31, and a section 42 which corresponds, for example, to section 32. As regards the parameter contained in section 41, the same is true as for the parameter contained in section 31, and the further parameters contained in sections 32 and 42 will often have mutually inverse values. Furthermore, adjustment message 40 comprises a section 43 which comprises, for example, the destination code of the old base station (from before a handover procedure), a section 44 which comprises, for example, the destination code of the new base station (from after a handover procedure), and a section 45 which comprises, for example, the destination code of the mobile terminal. Other data can be incorporated in section 46.

The options of using parameters contained in sections 31, 41 and 32, 42 and further parameters will result in an extension of all the generating means and adjustment-message generating means for the further generation of a further parameter for indicating whether the message is a signalling message or an adjustment message and for further generating a parameter for indicating transmission of the message to higher- or lower-ranked entities, and in an extension of, for example, comparison means contained in the base station and detection means for further detecting a parameter for indicating transmission of the message to higher- or lower-ranked entities and for further detecting a further parameter for indicating whether the message is a signalling message or an adjustment message. These options reduce, in particular, the size of and/or the number of analytical processes in base stations.

The adjustment messages which came up earlier in the discussion of FIG. 2 and FIG. 3 will, in general, not be generated as a consequence of the sudden occurrence of a temporary link fault, but will often form a component of a complete handover procedure. In the section below, it is assumed that mobile terminal 2 generates the adjustment message.

A backward handover procedure proceeds as follows. Link detection means which are associated with transceiver 20 and continuously monitor radio link 5 and compare the quality thereof with other radio links to other base stations, detect, at a given instant, that the quality of radio link 5 to base station 1 is appreciably poorer than the quality of radio link 6 to base station 3. At the same time, the identification of base station 3 is consequently known at mobile terminal 2. Mobile terminal 2 then transmits a first adjustment message to base station 1 and a second adjustment message via base station 1 to processor device 4. Of course, both adjustment messages may also coincide, in which case base station 1 has to pass said adjustment message to processor device 4. At the same time, radio link 6 is set up between base station 3 and mobile terminal 2. In response to the adjustment message, a signal is transmitted, for example, via comparison means 13 and/or processor 16 to return means 18 which, starting from that instant, return all the signalling messages destined for mobile terminal 2 to processor device 4 which, via the adjustment message, is informed of the fact that all the signalling messages should be transmitted to mobile terminal 2 via base station 3 from now on.

A forward handover procedure, in which radio link 5 is consequently suddenly interrupted completely, proceeds as follows. Radio link 6 between base station 3 and mobile terminal 2 is set up as quickly as possible as a result of the continuous comparison made by the link detection means associated with transceiver 20. Mobile terminal 2 then transmits an adjustment message to base station 3, which has to dispatch said adjustment message to processor device 4 or transmits an adjustment message to processor device 4 via base station 3. Processor device 4 is informed in this way of the fact that all the signalling messages have to be transmitted to mobile terminal 2 via base station 3 from now on. Furthermore, processor device 4 should either be able to pass the adjustment message to base station 1 or it should be able to transmit a signalling message provided with a base-station destination code to base station 1 in order to inform said base station 1 of the handover procedure performed. Because link detection means associated with transceiver 10 have also detected the disappearance of radio link 5, all the signalling messages provided with a terminal destination code are not lost but are still stored in return means 18 or have already been returned to processor device 4.

Prior to the generation of an adjustment message, "negotiations" could be carried out between all the entities. This is done on the basis of the signalling messages which are provided with destination codes and are exchanged between the entities concerned.

As discussed in the case of the forward handover procedure, adjustment messages may also originate from, for example, a processor device or from a still higher-ranked entity. They may also originate from a base station. However, in all these cases, various signalling messages often have to be exchanged beforehand because, in the case of a certain old or new base station, the identity of the new or old base station will not always be known and because, in the case of a higher-ranked entity, both -identities will not always be known.

We claim:

1. A mobile telecommunications system comprising:

at least one processor device for processing signaling messages;

at least one base station coupled to the processor device; and at least one mobile terminal which can be coupled to the base station, wherein signaling messages include a destination code field, wherein a signaling message to be transmitted from the mobile terminal to the processor device via the base station is provided with a first destination code in its destination code field and a signaling message to be transmitted from the mobile terminal to the base station is provided with a second destination code in its destination code field, wherein the base station is provided with comparison means for comparing a value in the destination code field of a signaling message with at least one predetermined value and, in response to a comparison result in one sense, transmitting the signaling message in the direction of the processor device and, in response to a comparison result in another sense, retaining the signaling message for internal processing, wherein a signaling message to be transmitted from the base station to the processor device is provided with a third destination code in its destination code field, wherein the processor device includes comparison means for comparing the value in the destination code field of the signaling message with at least one predetermined value and for transmitting the signaling message, in response to a comparison result in one sense, and, in response to a comparison result in another sense, for retaining the signaling message, wherein signaling messages to be transmitted from the processor device to the mobile terminal via the base station are provided with a terminal destination code field, wherein signaling messages to be transmitted from the processor device to the base station are provided with a base station destination code field, and wherein the base station is provided with detection means for detecting base station destination codes and, in response thereto, retaining a signaling message and for detecting terminal destination codes and, in response thereto, transmitting a signaling message in the direction of the mobile terminal.

2. The mobile telecommunication system according to claim 1, wherein the processor device includes:

memory means for storing at least one coupling between a terminal destination code and a base station destination code for each mobile terminal; and adjustment means coupled to the memory means for adjusting, in response to an adjustment message, at least one coupling stored in the memory means, and wherein the base station further includes:

link detection means for detecting whether or not a link between the base station and the mobile terminal is functioning well; and return means coupled to the link detection means for returning a signaling message provided with a terminal destination code to the processor device in response to it having been detected that the link is not functioning well.

3. The mobile telecommunication system according to claim 2, wherein the base station further includes adjustment-message generating means coupled to the link detection means for generating an adjustment message.

4. The mobile telecommunication system according to claim 2, wherein the mobile terminal includes:

link detection means for detection whether or not a link between the base station and the mobile terminal is functioning well; and adjustment-message generating means coupled to the link detection means for generating an adjustment message.

5. A base station for use in a mobile telecommunication system, the base station comprising:

a) comparison means for comparing first and second destination codes of signaling messages originating from a mobile terminal with at least one predetermined value;

b) means for transmitting, in response to a comparison result in one sense, a signaling message in the direction of a processor device and, in response to a comparison result in another sense, for retaining a signaling message for internal processing;

c) generating means for generating a signaling message having a third destination code and being destined for the processor device; and d) detection means for detecting base station destination codes and, in response thereto, retaining a signaling message, and for detecting terminal destination codes and, in response thereto, transmitting a signaling message in the direction of a mobile terminal.

6. The base station according to claim 5 further comprising:

e) link detection means for detecting whether or not a link between the base station and the mobile terminal is functioning well; and f) return means coupled to the link detection means for returning a signaling message provided with a terminal destination code to the processor device in response to it having been detected that the link is not functioning well.

7. The base station according to claim 6 further comprising:

g) adjustment-message generating means coupled to the link detection means for generating an adjustment message.

* * * * *